US012524399B2

(12) United States Patent
Tyagi et al.

(10) Patent No.: US 12,524,399 B2
(45) Date of Patent: Jan. 13, 2026

(54) SYSTEMS AND METHODS FOR ITERATIVE LARGE LANGUAGE MODEL AGENT AND TOOL SELECTION FOR PROCESSING INFORMATION REQUESTS

(71) Applicant: Stripe, Inc., South San Francisco, CA (US)

(72) Inventors: Ankesh Tyagi, South San Francisco, CA (US); Sreekanth Reddy Pothula, South San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 0 days.

(21) Appl. No.: 18/528,656

(22) Filed: Dec. 4, 2023

(65) Prior Publication Data
US 2025/0181576 A1    Jun. 5, 2025

(51) Int. Cl.
*G06F 16/00* (2019.01)
*G06F 16/245* (2019.01)
*G06F 16/248* (2019.01)

(52) U.S. Cl.
CPC .......... *G06F 16/245* (2019.01); *G06F 16/248* (2019.01)

(58) Field of Classification Search
None
See application file for complete search history.

(56) References Cited

U.S. PATENT DOCUMENTS

| 12,106,318 | B1 * | 10/2024 | Chiang | ................ | G06Q 30/016 |
| 2010/0070448 | A1 * | 3/2010 | Omoigui | ............. | H01L 27/1463 |
| | | | | | 706/55 |
| 2024/0302803 | A1 * | 9/2024 | Bagoly | ................. | G06N 20/00 |

* cited by examiner

*Primary Examiner* — Anhtai V Tran
(74) *Attorney, Agent, or Firm* — Foley & Lardner LLP

(57) ABSTRACT

A computer using the systems and methods described herein can use a task agent to automatically select and manage different applications and agents to use to generate results in response to requests for information. The computer can iteratively execute the task agent to generate the results. For instance, the task agent can identify a set of applications to use to generate a result in response to an information request. The task agent can identify the set of applications based on an intent of the information request. The task agent can iteratively execute different sequences of applications from the set of applications to query and retrieve data from different data sources until determining the data that is necessary to generate a response to the request has been retrieved. The computer can generate the response from the retrieved data and present the response on a user interface.

19 Claims, 5 Drawing Sheets

200

Receive, via a user interface, a request for information for processing via at least one machine learning model. 210

Execute the at least one machine learning model using a context of the request to determine an intent of the request. 220

Identify, using a task agent, a set of applications and one or more tasks to return a result for the request for information based at least on the intent. 230

Execute, using the task agent, an application of the set of applications to generate a result containing a set of data based on the one or more tasks. 240

Results satisfy tasks? 250

N

Y

Generate an aggregated result based on at least a first result and a second result. 260

Present the aggregated result on the user interface responsive to the request. 270

FIG. 2

SYSTEMS AND METHODS FOR ITERATIVE LARGE LANGUAGE MODEL AGENT AND TOOL SELECTION FOR PROCESSING INFORMATION REQUESTS

TECHNICAL FIELD

This application relates generally to methods and systems for iterative large language model agent and tool selection for processing information requests and various requested processes.

BACKGROUND

The rapid proliferation of advanced computing and digital technologies has led to the development of complex systems that involve interactions between various machine learning models, applications, and data sources. Such systems can be used to generate reports in response to requests for information. For example, a computer may receive a request to generate a report that includes information regarding different systems (e.g., an operating expenses system, a human resources system, a customer relationship management (CRM) system, etc.) of an organization. A machine learning model may be trained to output text or graphical responses to such requests. Given the dynamic nature of the data in such systems and the configuration of the machine learning model, the machine learning model may not be able to perform operations that are needed to generate a requested report, such as retrieving data from the different systems or performing mathematical operations on the retrieved data. Accordingly, the system may call other applications to perform these operations.

SUMMARY

Systems and methods using a machine learning model may utilize applications to provide additional data or services. Some conventional machine learning models may utilize a predetermined sequence of applications to generate a single data query from a single data source (e.g., a data warehouse) to generate a report without determining whether the results of the data query are accurate or enough to adequately respond to the request. Some conventional systems rely on a human input or a complicated set of rules to select which applications to use for processing. However, it is desirable to have a more dynamic configuration that can automatically select appropriate applications to provide information responsive to a request.

A computing device can use a task agent to automatically select and manage different applications (e.g. tools) and agents to generate results data from multiple data sources in response to requests for information. The task agent can be or include a machine learning model, such as a machine learning language processing model (e.g., a large language model), that has been trained to identify applications stored in the memory of the computing device based on intents of information requests. The task agent can be configured to execute other applications stored in the memory of the computing device. In one example, the computing device can receive an information request from a user interface. The computing device can execute a machine learning model (e.g., a machine learning language processing model, such as a large language model) to automatically determine (e.g., using the large language model's neural reasoning capabilities) an intent (e.g., a purpose or motivation) of the information request and/or deduce the next steps for generating a response to the information request processing based on the content or context of the information request. The computing device can input the intent into the task agent. The computing device can execute the task agent using the intent to output identifications of one or more applications of a set of applications and one or more tasks to respond to the information request. The task agent can use the identified set of applications to iteratively retrieve data from different data sources and generate results from the retrieved data until the task agent determines the generated results satisfy the one or more tasks determined based on the information request. The computing device can present the results at the user interface. Accordingly, the computing device can use the task agent to dynamically respond to information requests using data from multiple data sources.

Using the methods and systems discussed herein, a server (e.g., the analytics server) may orchestrate various process requests received by an AI model, such as a large language model. Accordingly, the neural reasoning power of the large language model can be utilized to identify suitable software solutions and tools that could be implemented to satisfy the received requests without the need for an analyst's intervention and/or user inputs.

The computing device can iteratively execute the task agent to retrieve data from different data sources and generate results for an information request from the retrieved data. For instance, the task agent can generate identifications for a set of applications for the computing device to use to generate a result in response to an information request based on the intent of the information request. The set of applications can be or include a set of tools that are configured to output schema information that can be used to query different data sources that correspond to the individual applications. In some cases, the set of applications can include applications that are configured to perform specific tasks to generate the result, such as an application that is configured to query a data source or an application that is configured to perform analytical processes on retrieved data to generate the result. The task agent (and sometimes the analytics server) can execute a first application (e.g., a first tool) to generate schema information (e.g., details regarding the format in which data is stored) that corresponds to a first data source. The task agent or the first application can input the schema information and the intent of the information request into a querying agent including a machine learning model (e.g., a machine learning language processing model). The task agent can execute the querying agent. Based on the execution, the querying agent can output a first data query. The querying agent can query the first data source with the first data query to retrieve a first set of data. The task agent (and sometimes the analytics server) can generate a result (e.g., a summary or a representation of the data in a different format, such as in a graph or table) based on or as a function of the first set of data by executing an application configured to process the first set of data to generate results. The task agent can then perform this process again responsive to determining more results are needed to satisfy the information request, but using a second application (e.g., a second tool) to generate schema information for the querying agent to use to generate a second data query to query a second data source. For example, the task agent can not only send secondary requests to other tools or systems, but the task agent can reason based on the results that are generated from the first set of data. Accordingly, the task agent can be an intelligent reasoning engine with decision-making capabilities. The task agent can iteratively perform this process until the task agent determines all of the data that is needed to generate a result to the information request has been retrieved. The computing device can generate an aggregated result based on the results for each iterative data query and display the aggregated result on a user interface. Accordingly, the iterative execution of the task agent can enable the computing device to generate a comprehensive response generated from data from different data sources.

Embodiments described herein can provide a process for responding to queries using a large language model that the large language model may not be able to accurately respond to based only on learned weights and/or parameters. For example, a large language model may not be able to accurately respond to math related requests or requests involving data that changes over time or that is stored in a database separate from the large language model. By performing the systems and methods described herein, the large language model may use a chain of applications and/or other large language models to query for data and perform calculations on the data. The large language model may receive the results of performing such functions and generate an output responding to a request, thus avoiding hallucinations by the large language model or responses that indicate that the large language model cannot generate a response to requests for calculations based on data stored in external data sources.

In some embodiments, a system includes a server comprising memory. The server can be configured by computer readable media to receive, via a user interface, a request for information for processing via at least one machine learning model; execute the at least one machine learning model using a context of the request to determine an intent of the request; identify, using a task agent, a set of applications and one or more tasks to return a result for the request for information based at least on the intent; execute, using the task agent, a first application of the set of applications to generate a first result containing a first set of data based on the one or more tasks; responsive to determining, using the task agent, whether to execute, using the task agent, a second application of the set of applications based on the one or more tasks and the first result containing the first set of data, execute the second application to generate a second result containing a second set of data based on the one or more tasks, wherein the task agent iteratively determines whether to execute another application based on whether all generated results satisfy the one or more tasks; generate an aggregated result based on at least the first result and the second result; and present the aggregated result on the user interface responsive to the request.

In some embodiments, a method includes receiving, by a server via a user interface, a request for information for processing via at least one machine learning model; executing, by the server, the at least one machine learning model using a context of the request to determine an intent of the request; identifying, by the server using a task agent, a set of applications and one or more tasks to return a result for the request for information based at least on the intent; executing, by the server using the task agent, a first application of the set of applications to generate a first result containing a first set of data based on the one or more tasks; responsive to determining, by the server using the task agent, whether to execute a second application of the set of applications based on the one or more tasks and the first result containing the first set of data, executing, by the server using the task agent, the second application to generate a second result containing a second set of data based on the one or more tasks, wherein the task agent iteratively determines whether to execute another application based on whether all generated results satisfy the one or more tasks; generating, by the server, an aggregated result based on at least the first result and the second result; and presenting, by the server, the aggregated result on the user interface responsive to the request.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 2 illustrates a flowchart depicting operational steps for iterative large language model agent and tool selection for processing information requests, according to an embodiment.

DETAILED DESCRIPTION

Figure 1:
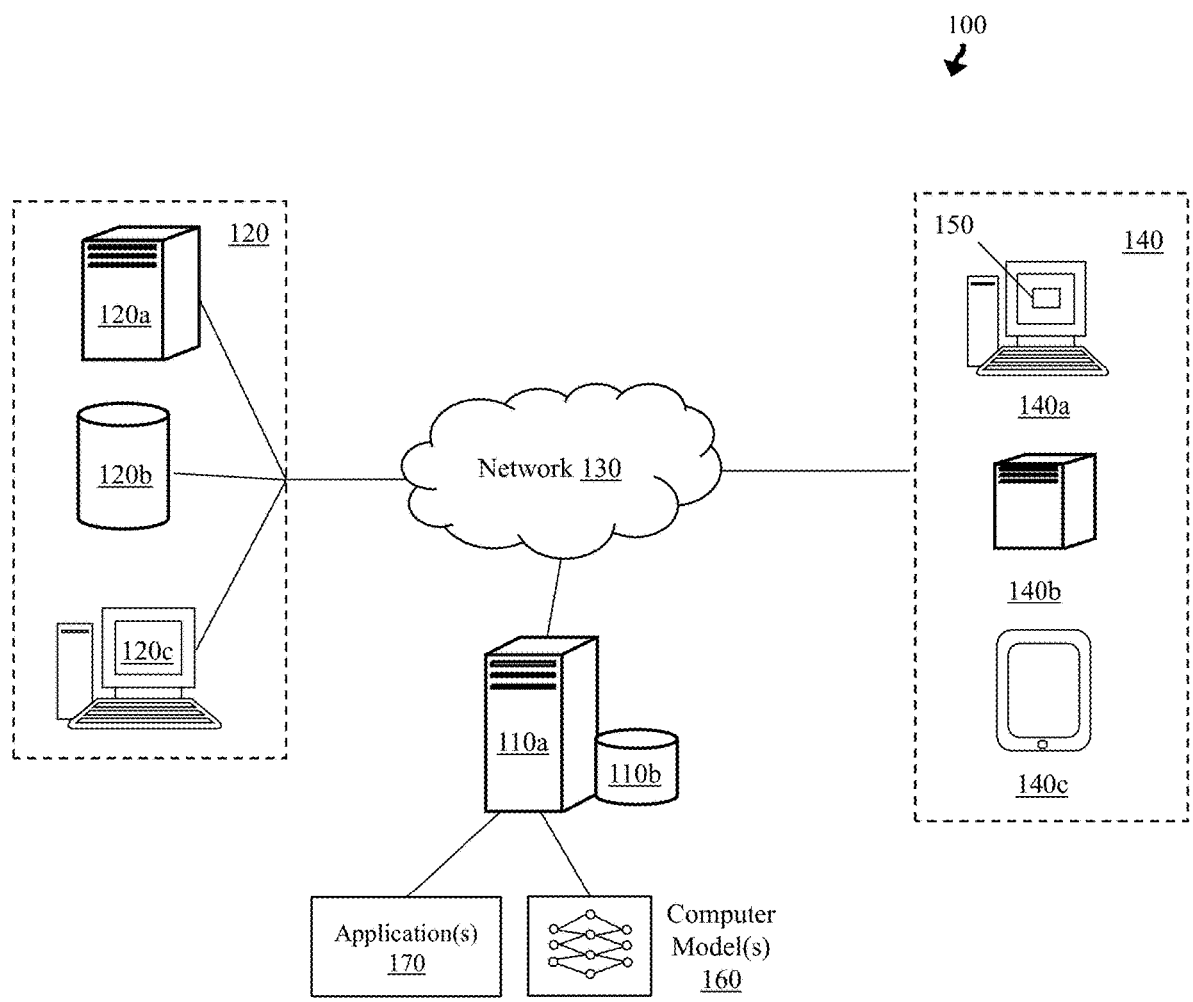
FIG. 1 illustrates a computing system for iterative large language model agent and tool selection for processing information requests, according to one or more embodiments.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 is a non-limiting example of components of an application processing system 100 in which an analytics server 110a operates. In some examples, other servers such as third party servers or other system servers may work with the analytics server to process requests. The analytics server 110a may utilize features described in FIG. 1 to retrieve data and generate/display results, such as via a platform displayed on various devices. The analytics server 110a may be communicatively coupled to a system database 110b, electronic data sources 120a-d (collectively electronic data sources 120), and user devices 140a-c (collectively user devices 140). The analytics server 110a can receive information requests (e.g., information queries or requests for information) from the user devices 140. The analytics server can iteratively execute computer models 160 and applications 170 to generate data queries to query the data sources 120 to generate results in response to the information requests. The system 100 is not confined to the components described herein and may include additional or other components not shown for brevity, which are to be considered within the scope of the embodiments described herein.

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The analytics server 110a may generate and display an electronic platform (e.g., an information generation platform that is sometimes referred to as a platform) on any device discussed herein. The platform may be configured to receive requests for recommendations of fault simulations to run on a network infrastructure and automatically output sets of faults in response to such requests. For instance, the electronic platform may include one or more graphical user interfaces (GUIs) displayed on the user device 140. An example of the platform generated and hosted by the analytics server 110a may be a web-based application or a website configured to be displayed on various electronic devices, such as mobile devices, tablets, personal computers, and the like. The platform may include various input elements configured to receive information requests from any of the users and display results in response to such information requests during execution of the methods discussed herein. The analytics server 110a may iteratively execute the computer models 160 and the applications 170 to process and generate responses to the information requests.

The analytics server 110a may be any computing device comprising a processor and non-transitory, machine-readable storage capable of executing the various tasks and processes described herein. The analytics server 110a may employ various processors such as a central processing unit (CPU) and graphics processing unit (GPU), among others. Non-limiting examples of such computing devices may include workstation computers, laptop computers, server computers, and the like. While the system 100 includes a single analytics server 110a, the analytics server 110a may include any number of computing devices operating in a distributed computing environment, such as a cloud environment.

User devices 140 may be any computing device comprising a processor and a non-transitory, machine-readable storage medium capable of performing the various tasks and processes described herein. Non-limiting examples of a user device 140 may be a workstation computer, laptop computer, phone, tablet computer, or server computer. During operation, various users may use one or more of the user devices 140 to access the platform operationally managed by the analytics server 110a. Even though referred to herein as "user" devices, these devices may not always be operated by users. A user device 140 may be another computing system that automatically transmits information requests to the analytics server without any user input.

Through the platform, the analytics server 110a can receive a request for information. The analytics server 110a can receive the request from a user interface 150 that is being displayed at a user device 140. The request can include text, images, audio, speech, etc. In some cases, the analytics server 110a can receive the request from a chat component displayed on the user interface 150. In one example, the request can include text asking for a summary of data from different data sources (e.g., the data sources 120). The analytics server 110a can receive the request via an application programming interface (API) executing on the analytics server 110a. The analytics server 110a can execute a computer model 160 (e.g., at least one machine learning model, such as a machine learning language processing model) to determine an intent (e.g., a purpose or motivation) of the request for information. The analytics server 110a can execute a task agent. The task agent can be a computer model 160 that includes a machine learning language processing model and code to execute other applications. The task agent can be configured to use the intent to identify a set of applications of the applications 170 and one or more tasks to return a result to the request for information. The tasks can be or correspond to outputs for the response, such as "generate a table summarizing data of Acme Co." or "depict data points indicating organization operations for Blue Sky Inc." The tasks can additionally or instead correspond to operations to perform to generate such outputs, such as "call application A to retrieve data from data source A" or "call application B to process or analyze data retrieved from data source A to generate the table summarizing data of Acme Co." The task agent can output such tasks as text strings or other machine-readable media that can be used for further processing. The analytics server 110a can use the task agent to select which applications of the set of applications to use and execute the selected application to perform or satisfy the one or more tasks. The task agent or the analytics server 110a can iteratively execute the applications of the set of applications to return the result.

In one example, the task agent can select an application from the set of applications. The first application can be a tool that corresponds to a first data source 120. The task agent can execute the first application to generate schema information for the first data source. The task agent can identify a querying agent or application of the applications 170 that is configured to generate data queries. The querying agent can be or include a machine learning model (e.g., a machine learning language processing model) and/or can include code to perform data queries. The analytics server 110a can input the intent of the request for information and the schema information into the querying agent and execute the querying agent. Based on the execution, the querying agent can automatically generate a query (e.g., a Structure Query Language (SQL) query) that is configured to retrieve data from the first data source that corresponds to the request for information. The querying agent or the analytics server 110a can use the generated query to query the first data source to retrieve a first set of data. The task agent can generate a first result from the first set of data, such as by generating a graph or summary of the first set of data using another application of the applications 170. In some embodiments, the analytics server may generate and/or aggregate the results.

The task agent can determine whether to execute a second application based on the one or more tasks and the first result containing the first set of data. To do so, the task agent can determine whether the first result satisfies the one or more tasks of the request for information. For instance, the task agent can receive the first result or the first set of data and the one or more tasks as input and generate an indication as to whether further data is needed to satisfy or complete the one or more tasks. Responsive to determining further data is needed, the task agent can output an identification of a second application of the set of applications. The second application can be a tool that corresponds to a second data source 120. The task agent can execute the second application to generate schema information for the second data source. The task agent can identify the querying agent of the applications 170 that is configured to generate data queries. The task agent can input the intent of the request for information and the schema information from the second application into the querying agent and execute the querying agent. Based on the execution, the querying agent can automatically generate a query that is configured to retrieve data from the second data source that corresponds to the request for information. The querying agent or the analytics server 110a can use the generated query to query the second data source to retrieve a second set of data. The task agent can generate a second result from the second set of data, such as by generating a graph or summary of the second set of data using another application.

The task agent can determine whether to execute another application based on the first and second results. The task agent can iteratively repeat this process to generate new results until the task agent determines an aggregation of all of the generated results satisfy the one or more tasks that correspond to the request for information. The analytics server 110a can generate an aggregated result based on the first result, the second result, and any further results that are generated to complete or satisfy the one or more tasks. The analytics server 110a can do so by combining the results into different types of graphs, tables, text summaries, charts, etc., using a function or analytical protocol on different portions of the results. The analytics server 110a can present the aggregated result on the user interface 150 in a response to the request for information.

By implementing the task agent, the analytics server 110a can dynamically respond to requests for information that require data retrieval from different data sources and for different functions to be performed on the retrieved data. In doing so, the analytics server 110a can facilitate operation of a machine learning language processing model architecture that receives information requests to generate results that require analytical processing of data with different data sources and do so using different iterations of a chain of applications without using any defined patterns that may not be able to account for every permutation of application data retrieval and processing.

FIG. 2 illustrates a flow diagram of a process executed in an application processing system, according to an embodiment. The method 200 includes steps 210-260. However, other embodiments may include additional or alternative execution steps, or may omit one or more steps altogether. The method 200 is described as being executed by a server, similar to the analytics server described in FIG. 1. However, one or more steps of method 200 may also be executed by any number of computing devices operating in the distributed computing system described in FIG. 1. For instance, one or more computing devices (e.g., user devices) may locally perform part or all of the steps described in FIG. 2. Moreover, one or more of the steps of the method 200 can be performed via any processor of the system, such as any processor the system 100.

Various actions here are described in terms of being executed by the analytics server, the task agent, or a combination of the reasoning agent and the task agent. However, these actions can be executed by any of the features discussed herein and/or depicted within FIG. 1. For instance, in one embodiment an action can be performed by the task agent. However, additionally or alternatively, the same action can be performed (in other embodiments) by the analytics server.

Using the methods and systems described herein, such as the method 200, the analytics server may automatically respond to requests for information with a result that the analytics server aggregates from multiple data sources. The analytics server can do so using a chain of machine learning models and applications. For instance, the analytics server can execute a task agent that facilitates the applications and/or machine learning models to use to respond to requests. The task agent, the reasoning agent, or a combination of the task agent and the reasoning agent can determine a set of applications to use to respond to a request for information based on an intent of the request for information. The task agent can iteratively execute the set of applications to retrieve data to generate results until the task agent generates an output indicating that the iteratively generated results satisfy one or more tasks. The analytics server can aggregate the results and output the aggregated results to the requesting entity. In some embodiments, the analytics server can execute the applications that the task agent selects instead of the task agent.

At step 210, the analytics server may receive a request for information. The analytics server can be configured to perform reasoning, analytics, and/or other tasks executions. The analytics server can receive the request for information via a user interface. The user interface may be presented on a client device being accessed by a user. For example, the analytics server can receive the request from a graphical or text input (e.g., chat) or audio input (e.g., microphone) component of the user interface. The request for information can be a request for processing data from one or more data sources via at least one machine learning model (e.g., a machine learning language processing model, such as a large language model, of the analytics server). The analytics server can receive the request for information as text, audio, speech, images, or any combination of such types of content. In some examples, the analytics server can receive the request via an application programming interface (API) rather than through a user interface. In some examples, the API may be called by another application to provide the request. In one example, the request can be for a summary of performance of different systems (e.g., an operating expenses system, a human resources system, a customer relationship management (CRM) system, etc.) of an organization over a defined time period in a text and graph format. The analytics server can receive the request and input the request into at least one machine learning model for processing.

At step 220, the analytics server may execute at least one machine learning model. The analytics server may execute at least one machine learning model using the context of the request for information to determine an intent of the request. For example, the analytics server can input the information request as a prompt into at least one machine learning model. The analytics server can execute the at least one machine learning model by applying the weights and/or parameters of the at least one machine learning model to the content (e.g., the text, images, audio, speech, etc.) of the request. In doing so, at least one machine learning model may use the context of the request, such as the object of the request, the type of information that is requested in the request, a data source identified in the request, etc., to determine an intent of the request. The intent may be the purpose or motivation of the request. The intent can indicate a type of data to analyze or a source of data from which to retrieve data to generate a result or response to the information request. At least one machine learning model may output the intent as text, audio, an image, or any other form of output.

For example, the analytics server can receive a request from a user device for a summary of performance of different systems of an organization over a defined time period. The analytics server can input the request into at least one machine learning model. The at least one machine learning model can be or include a reasoning agent configured to determine intents based on information requests. The analytics server can execute the at least one machine learning model. Based on the execution, at least one machine learning model can output an intent that identifies the defined time period, identifications of the systems for which data needs to be retrieved, and the format of the desired response to the request.

At step 230, the analytics server may use a task agent to identify a set of applications and/or one or more tasks to return a result for the request for information. The task agent can be, include, or communicate with a machine learning model (e.g., a machine learning language processing model or a second machine learning model), such as a zero-shot agent that is configured to generate outputs based only a single input without any memory of prior inputs or outputs and that is configured to output identifications of applications of the analytics server to use to generate a result in a response to the information request that satisfies the one or more tasks. The task agent can be configured to execute the applications that the task agent identifies to use to generate the result. The analytics server can store the task agent in memory.

The analytics server may execute the task agent using the intent as input to cause the task agent to output an identification (e.g., a string of numerical or alphanumerical characters) for each of one or more applications of the set of applications and identifications for the one or more tasks. The set of applications can include different tools or applications that can be used to generate schema information for querying individual data sources (e.g., tables, databases, computing devices, etc.) for data, an application or agent that can generate data queries to such data sources, and/or applications that can process the retrieved data to generate results. The one or more tasks can be processes for the task agent to perform, such as retrieving data from a particular data source, generating results from the retrieved data in a particular format or using a particular function, or any other process. The task agent can apply learned weights and/or parameters to the intent determined by at least one machine learning model to output the identifications for the applications and/or tasks.

For example, the analytics server can determine an intent for a request for information that includes a defined time period, identifications of a customer relationship management system and an operating expenses system for which data needs to be retrieved to generate a response to the request for information, and a format of a graph and a text summary. The analytics server can input the intent into the task agent. Based on the intent, if the task agent cannot output the requested information itself, the task agent can output identifications of the applications that are configured to generate schema information for data sources that store data for the customer relationship management system and the operating expenses system, respectively. In some cases, the task agent can output identifications of other applications that can be used to generate a response to the request for information, such as applications that are configured to retrieve data from the data sources and process the retrieved data.

The task agent can be a zero-shot agent that is trained to identify specific applications to use to generate responses to information requests. For example, the task agent may be trained using a supervised training method in which different intents are input into the task agent and the task agent outputs identifications of applications. The task agent may be trained using back-propagation techniques and a loss function in which the internal weights and/or parameters of the task agent are modified (e.g., by the analytics server) based on a difference between the output identifications of the applications and the ground truth or the "correct" identifications of applications in response to the input. In doing so, the task agent may be trained based on the locations of different data sources that correspond to the applications in which the correct applications store schema information for specific data sources (e.g., tables, databases, computing devices, etc.) to query to generate a response to information requests.

In some cases, the task agent may not be able to generate identifications for the set of applications based on the intent. Such may occur, for example, when the intent does not specify a data source or a type of output to include in the response to the request for information. When this occurs, the analytics server may request additional information from a user. For example, the analytics server can execute the reasoning agent to infer intent of a request for a summary of data from the past two weeks as input. The analytics server can execute the task agent to generate an output indication that more information is needed to identify the set of applications because no systems were identified in the original request. The analytics server can present the indication that more information is needed to identify the set of applications at the user interface or at a second user interface presented on a client device different from a computing device presenting the user interface through which the request for information was input. The analytics server can receive additional information indicating a customer relationship management system and an operating expenses system from the user interface or the second user interface. The analytics server can execute at least one machine learning model (e.g., the reasoning agent) using the context of the initial request for information and the additional information to determine a second intent identifying the defined time period and the customer relationship management system and the operating expenses system. The analytics server can execute the task agent using at least the second intent to output an identification of each application of the set of applications. In some cases, instead of determining a second intent for the request for information, the analytics server can execute the task agent using the intent and the additional information to cause the task agent to output an identification of each application of the set of applications or otherwise identify the set of applications.

At step 240, the analytics server can use the task agent to execute a first application of the set of applications. The task agent may execute the first application responsive to the task agent outputting an identification of the first application (e.g., an identification of an application that corresponds to a particular data source, such as a customer relationship management system) or otherwise identifying the first application. The first application can be a tool that is configured to generate schema information. The schema information can include information about a first data source, such as tables of the first data source, columns and/or fields of the tables, data types of the fields, primary keys and/or foreign keys in the tables, relationships between the tables (e.g., one-to-one, one-to-many, many-to-many), indexes of the fields, constraints of the data in the database (NOT Null, Unique, Check, or Foreign Key Constraints), views, stored procedures and functions, triggers, etc. The first data source can be a database stored in memory of the analytics server or a database of a computing device remote from the analytics server. Different data sources may have different schemas in data storage, so the schema information generated by the first application can facilitate data retrieval from the first data source. The first application or the task agent can pass the schema information to a querying agent, in some cases with other data regarding the request for information, such as the intent of the request for information or a task identified for the request for information for which data is being retrieved from the first data source.

The querying agent can be or include a machine learning model (e.g., a machine learning language processing model) configured to automatically generate data queries based on schemas and any other data that the querying agent receives from an application executed by the analytics server. The querying agent can be configured to perform the data queries. The task agent or the first application can input the schema information, the intent of the request for information, and/or the task identified for the data retrieval into the querying agent and execute the querying agent. In response to the execution, the querying agent can apply learned weights and/or parameters to the input and generate text or code for a first data query to the first data source. The first data query can be a query for data to use to generate a result that satisfies the task for which the data is being queried. The querying agent can generate a first data query as a structured query language (SQL) query, a MongoDB query, a Cassandra Query Language (CQL) query, a Redis query, an Elasticsearch query, and Apache Solar query, a cypher query, a gremlin query, a SPARQL query, an XQuery, an Xpath query, etc.

The querying agent can query the first data source using the generated first data query either by querying a database in memory of the analytics server or by querying a database remote from the analytics server (e.g., by transmitting a request including the first data query to a remote computing device storing the database). The querying agent can retrieve a first set of data from the first data source using the first data query.

For example, the task agent can input schema information for a table that stores data for a customer relationship management system, an intent to generate a summary of data for a defined time period from the customer relationship management system and the operating expenses system, and a task to generate a table in a database for the customer relationship management system into the querying agent and execute the querying agent. Based on the input, the querying agent can generate a query (e.g., a query in Python or SQL) to a table containing data for the customer relationship management system. The querying agent can retrieve the customer relationship management system data from the table using the generated query.

The task agent can generate a first result based on and/or to contain the retrieved first set of data. For example, the first set of data can contain different data points regarding the request for information. The task agent can aggregate or otherwise combine the data points into one or more graphs or tables summarizing or otherwise depicting the different data points of the first set of data in a new format as the first result. In another example, the task agent can execute a function on the data points of the first set of data, such as by determining an average, a median, a mode, a standard deviation, etc., of the data points as the first result. The task agent can insert the output or outputs of such functions in the graphs or tables of the first result to include the first set of data in the first result. The task agent can perform different functions on different subsets of the first set of data and/or generate the first result in different formats in any manner.

The task agent can generate the first result using an agent or application that is configured to perform different types of operations on data. The task agent or the querying agent can pass the first set of data to the agent or application with the task for which the first set of data was retrieved. The task agent can execute the agent or application to cause the agent or application to generate the first result.

For example, the task agent can receive an input intent regarding a question about sales. Based on the intent, the task agent can generate an identification of an application associated with sales. The task agent can execute the application, and the application can generate schema information indicating a format of a table in a database in which sales data is stored. The task agent or the executed application can send the generated schema information, the intent, the content of information request, or any combination thereof, to the querying agent. The querying agent can process the received information to generate a query. The querying agent can use the query to retrieve data from the table. The task agent can execute another application to generate a result from the retrieved data.

At step 250, the analytics server may interact with the task agent to determine whether to execute another application (e.g., a second application) of the set of applications. The analytics server may do so based on the one or more tasks and the first result containing the first set of data. For example, the analytics server can input the first result, the first set of data, and/or the identifications of the one or more tasks into the task agent and execute the task agent. Based on the execution, the task agent can either output an indication that no more executions of applications are needed or an identification of a second application or a second series of applications to use or execute to satisfy the one or more tasks. In some cases, the task agent can generate the output based on whether each of the one or more tasks are satisfied by the first result and/or the first set of data. In this way, the task agent can iteratively execute applications to generate results that can then be used by the task agent or the reasoning agent to take contextually appropriate next steps which could involve calling other applications, agents, and/or displaying results.

For example, the task agent can execute another application to generate a table that includes data for a customer relationship management system in response to an information request for a table including data for a customer relationship management system and a table including data for an operating expenses system. The task agent can generate the table for the customer relationship management system by executing an application or agent using the data for the customer relationship management system and the data for the operating expenses system as input. The analytics server can input the table for the customer relationship management system (e.g., as an image or as code used to generate the table), data that was used to generate the table, and/or tasks determined from the information request that indicate a requirement to generate the two tables to respond to the information request into the task agent. The task agent can generate an output indicating an identification of an application that corresponds to a data source storing data for the operating expenses system. The output can indicate one or more iterations of data retrieval and result generation is required to respond to the request for information.

Responsive to determining to execute the second application, the analytics server can repeat step 240 using the task agent. For example, the task agent may execute the second application responsive to the task agent outputting an identification of the second application. The second application can be a tool that is configured to generate schema information for a second data source that is different from the first data source. The schema information can include information about a second data source indicating how to format a query to the second data source. The second data source can be a database stored in memory of the analytics server or a database of a computing device remote from the analytics server. The task agent or the second application can pass the schema information generated by the second application to the querying agent, in some cases with other data regarding the request for information, such as the intent of the request for information or a task identified for the request for information for which data is being retrieved from the second data source.

The task agent can input the schema information, the intent of the request for information, and the task identified for the data retrieval into the querying agent and execute the querying agent. In response to the execution, the querying agent can apply weights and/or parameters to the input and generate text or code for a second data query to the second data source. The second data query can be a query for data to use to generate a result that satisfies the task for which the data is being queried. The querying agent can generate a second data query in the same or a different programming language to the first data query, depending on the schema information or configuration of the second data source. The querying agent can query the second data source using the generated second data query. The querying agent can retrieve a second set of data from the second data source using the second data query.

The task agent can generate a second result from the retrieved second set of data. The task agent can generate the second result to contain the second set of data. The task agent can generate the second result in different formats and/or using different functions similar to how the task agent generates the first result, as described herein. In some embodiments, the analytics server can generate the second result using an agent or application that is configured to perform different types of operations on data. The task agent or the querying agent can pass the second set of data to the agent or application with the task for which the second set of data was retrieved. The task agent can execute the agent or application to cause the agent or application to generate the second result.

The analytics server can repeat step 250 based on the first result and the second result. The analytics server can do so using the task agent. For example, the analytics server can combine the first and second results into a feature vector as an aggregation of the first and second results. The analytics server can include one or more tasks in the feature vector. The analytics server can input the feature vector into the task agent and execute the task agent to generate an output indicating whether all of the results satisfy one or more tasks. Based on the execution, the task agent can either output an indication that no more executions of applications are needed or an identification of a third application or a third series of applications to use or execute to satisfy the one or more tasks. The task agent can generate the output based on whether each of the one or more tasks are satisfied by the first result, the second result, the first set of data, and/or the second set of data. Responsive to determining to execute the third application, the analytics server can use the task agent to continue to iterate steps 240 and 250 by generating a third result from data from a third data source and determining whether to repeat the process again. The analytics server can use the task agent to iteratively repeat steps 240 and 250 any number of times until the task agent outputs an indication that no more iterations are needed based on the generated results from the executed applications. Although examples herein may recite the use of one, two, or three applications, it is intended that any number of iterations and applications may be used.

In one example, the task agent can generate a table that includes data for a customer relationship management system and a table that includes data for an operating expenses table in response to an information request for a table that includes data for a customer relationship management system and a table that includes data for an operating expenses system. The analytics server can input the tables for the customer relationship management system and the operating expenses system, data that was used to generate the tables, and/or tasks determined from the information request that indicate a requirement to generate the two tables to respond to the information request into the task agent. The task agent can generate an output indicating no further iterations are required based on the input because the tasks are satisfied. If there was a task to generate a third table from a third data source, the task agent would output an identification of an application that is configured to generate schema information to retrieve data for the third table. The analytics server can repeat this process for any number of iterations until the task agent determines no more data retrieval iterations are needed.

Responsive to the task agent determining no more iterations are needed, at step 260, the analytics server can generate an aggregated result. The analytics server can generate the aggregated result based on each of the results that the task agent generated in performing the steps 240 and 250. The analytics server can generate the aggregated result by combining the results (e.g., the analytics server can generate the aggregated result based on at least the first result and the second result). For example, the analytics server can generate a single output containing the tables, graphs, and/or values of the results. For instance, the analytics server can generate an output that contains tables generated from different systems identified in a request. In another example, the analytics server can generate the aggregated result by combining the sets of data contained in the results, such as by generating a new table or graph from the sets of data or by executing a function on different subsets of data that may include data from different sets of retrieved data to generate a result from the different sets of data. In some embodiments, the analytics server can use the task agent to generate the aggregated result (e.g., the task agent can combine the results to generate the aggregated result). The analytics server can generate the aggregated result in any manner.

At step 270, the analytics server may present the aggregated result. The analytics server may present the aggregated result on the user interface through which the analytics server received the request for information. In cases in which the analytics server received the request for information through a chat component of the user interface, the analytics server may present the aggregated result on the chat component or on a portion of the user interface that is separate from the chat component. The analytics server may present the aggregated result on any portion of the user interface.

The aggregated result on the user interface may include additional content from at least one machine learning model that originally determined the intent for the request for information. For instance, the analytics server can input the aggregated result into at least one machine learning model (e.g., a machine learning language processing model) and execute at least one machine learning model. At least one machine learning model may output a response that includes the aggregated result. For example, the analytics server can input a requested graph (e.g., as an image or as the code used to generate the graph) into the at least one machine learning model. The analytics server can execute the at least one machine learning model, and the at least one machine learning model can output text introducing and/or summarizing the graph and the graph itself. In doing so, the at least one machine learning model can add context to the aggregated result. The analytics server can present the aggregated result with any changes or additions to the aggregated result by the at least one machine learning model on the user interface.

In some cases, the information request can be or include a format for the result. In such cases, the analytics server can identify the format for the result and generate the aggregated result in the requested format. For example, the information request can include a request for the result to be depicted in a bar chart and table. The analytics server can identify the requested format and use the format to generate the aggregated result in a bar chart and table per the request. In another example, the request can include a request for a first type of data to be depicted in a first table, a second type of data to be depicted in a second table, and a third type of data to be depicted in a graph. The analytics server can generate the aggregated result in each of the requested formats.

Figure 3:
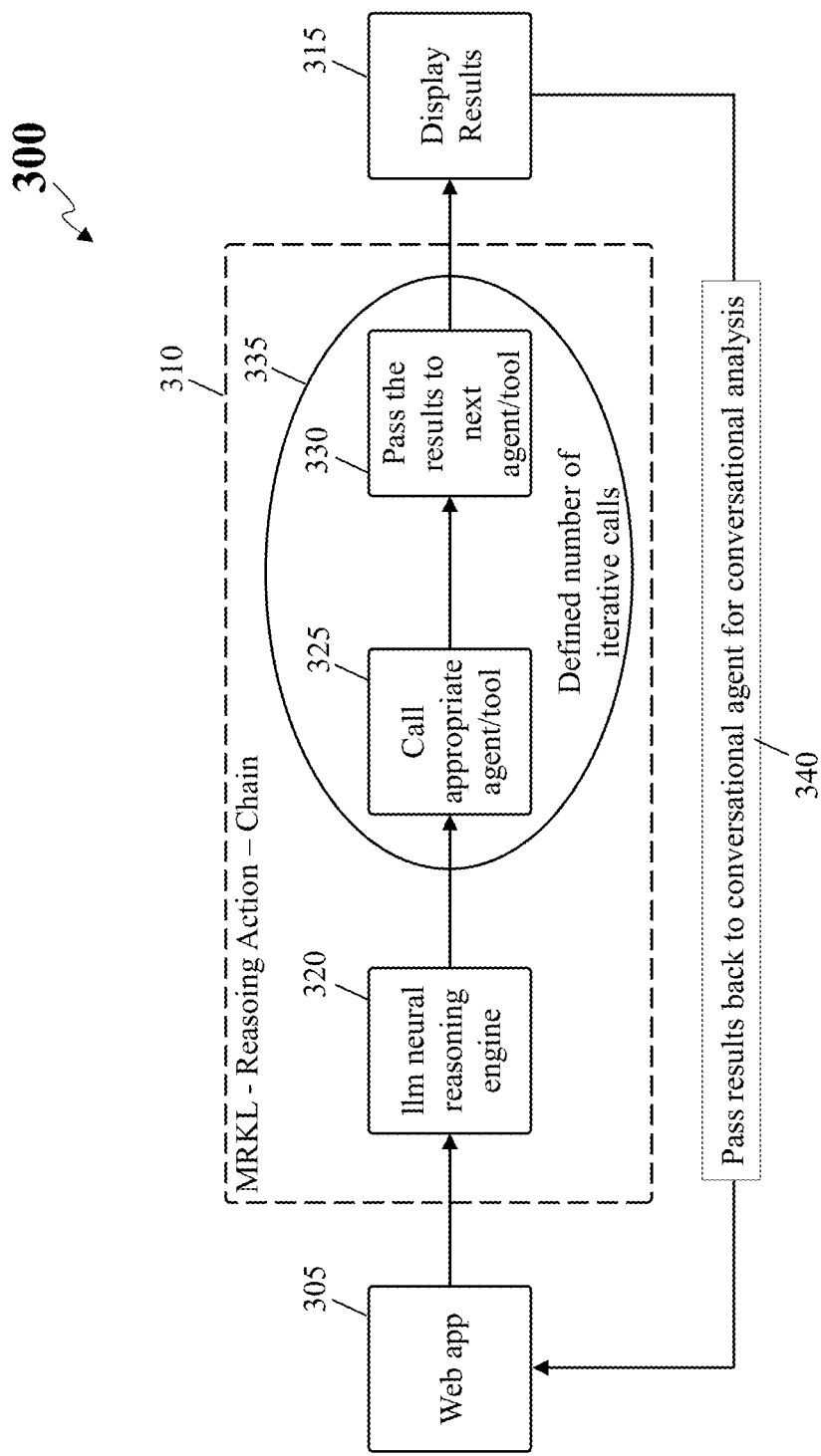
FIG. 3 illustrates a sequence diagram depicting operational steps for iterative large language model agent and tool selection for processing information requests, according to an embodiment.

FIG. 3 illustrates a sequence diagram 300 depicting operational steps for iterative large language model agent and tool selection for processing information requests, according to an embodiment. The operational steps may be performed by an analytics server (e.g., the analytics server 110a). However, one or more of the operational steps may be executed by any number of computing devices operating in the distributed computing system described in FIG. 1. For instance, one or more computing devices (e.g., user devices) may locally perform part or all of the operational steps described with reference to FIG. 3. Moreover, one or more of the operational steps can be performed via any processor of the system, such as any processor the system 100.

In the sequence diagram 300, an analytics server can execute a web application 305 to present a user interface at a computing device. The web application 305 can be an application configured to host a web platform through which a user can input requests for information. The analytics server can receive such requests and execute a chain 310 of applications to generate results that are responsive to the requests for information. In some embodiments, the web application 305 can be or include middleware (e.g., a middleware server) that can operate as a reasoning layer between various applications and data processes. The analytics server can display the results 315 at the user interface in response to the requests for information. The analytics server can present the results through the web application 305.

For instance, the analytics server can receive a request for information from a user interface presented by the web application 305 or via an API called by an application. The analytics server can process the request for information by executing at least one machine learning model 320 using the request for information as input. The at least one machine learning model 320 can be or include one or more machine learning language processing models (e.g., large language models or a large language model neural reasoning engine) configured to generate responses to input prompts. The at least one machine learning model 320 can process the request for information to generate an intent of the request for information. The analytics server can feed the intent into the same machine learning model or another machine learning model of the at least one machine learning model 320 operating as a task agent. Based on the intent, the task agent can generate identifications of a set of applications or agents 325 and one or more tasks to respond to the request for information. The task agent can execute an application of the applications or agents 325 based on the identifications of the set of applications or agents 325 to generate schema information. The task agent or the application can pass the schema information and other information regarding the information request (e.g., the information request itself, the intent, the task for which the application was called to generate the schema information, etc.) to a querying agent of the applications 330. The querying agent can generate a data query based on the schema information and other information regarding the information request. The querying agent can use the data query to retrieve a set of data from a data source. The task agent can execute another application of the applications 330 to generate a result that satisfies at least one task of the one or more tasks.

The task agent can determine whether to perform another iteration of data retrieval and data processing. For example, the analytics server can input the generated result into the task agent with the intent of the request for information and execute the task agent. Based on the execution, the task agent can either output an indication that no more executions of applications are needed or an identification of a second application to use or execute to satisfy the one or more tasks. Responsive to the task agent outputting an identification of a second application or otherwise identify a second application, the task agent can execute the second application to generate schema information for a second data source and repeat the data retrieval and result generation process to generate a second result. The analytics server can input both results into the task agent with the intent and/or the identifications of the one or more tasks and execute the task agent to determine whether to perform another data retrieval and result generation iteration. The task agent can iteratively use different applications of the applications 325 and 330 in this manner for a defined number of calls 335 (e.g., a number of applications to use for data retrieval to satisfy the one or more tasks) to retrieve sets of data from different data sources and generate results based on each of the retrieved sets of data. The task agent may do so until the task agent generates all of the results that are needed to satisfy the one or more tasks (e.g., until the task agents generates an indication that no more executions of applications are needed).

The analytics server can then display the results 315 at the user interface, such as by displaying the results individually at the user interface or by displaying the aggregated result at the user interface. In some cases, the analytics server can process the results 315 by passing the results to the web application 305 and using the at least one machine learning model 320 to generate a response in a conversational tone that includes the passed results. The analytics server can display the results through the web application 305.

The task agent can iteratively execute the applications or agents 325 and 330 in one or more iterations using different applications for each iteration to perform different operations. For instance, the task agent can identify different applications from the applications 325 and 330 to use to retrieve sets of data from different data sources to generate different results in different iterations and then generate an aggregated result from the results and/or the different sets of data.

For example, a user can interact with the at least one machine learning model 320 through the web application 305. The at least one machine learning model 320 can operate as the interface component of a reasoning layer while assisted by a zero-shot agent (e.g., another machine learning model of the at least one machine learning model 320), pre-defined tools, and/or other task-specific agents (e.g., Pandas Agent or a SQL Agent). Based on a user-provided prompt (e.g., an information request), the at least one machine learning model 320 can determine an intent of the user-provided prompt, this intent is then passed to the task agent to identify and choose from a list of provided tools and agents (e.g., the application 325) to complete one or more tasks. The task agent can choose an application from the applications 325 and execute the chosen application to generate schema information that can be used for data retrieval from a data source. The executed application or the task agent can pass the intent, the content or context of the user-provided prompt, the task for which the executed application was selected, and/or the schema information to a SQL Agent (e.g., an application of the applications 330) for data retrieval. This data can be returned to a Python Pandas Agent (e.g., another application of the applications 330), for example, for calculations or summarization. The task agent can evaluate the need to run another iteration of the chain, such as based on whether all of the one or more tasks have been completed. Once all the required iterations have run, the final results can be rendered through the user interface or sent back to the web application 305 directly for presentation 340.

Figure 4:
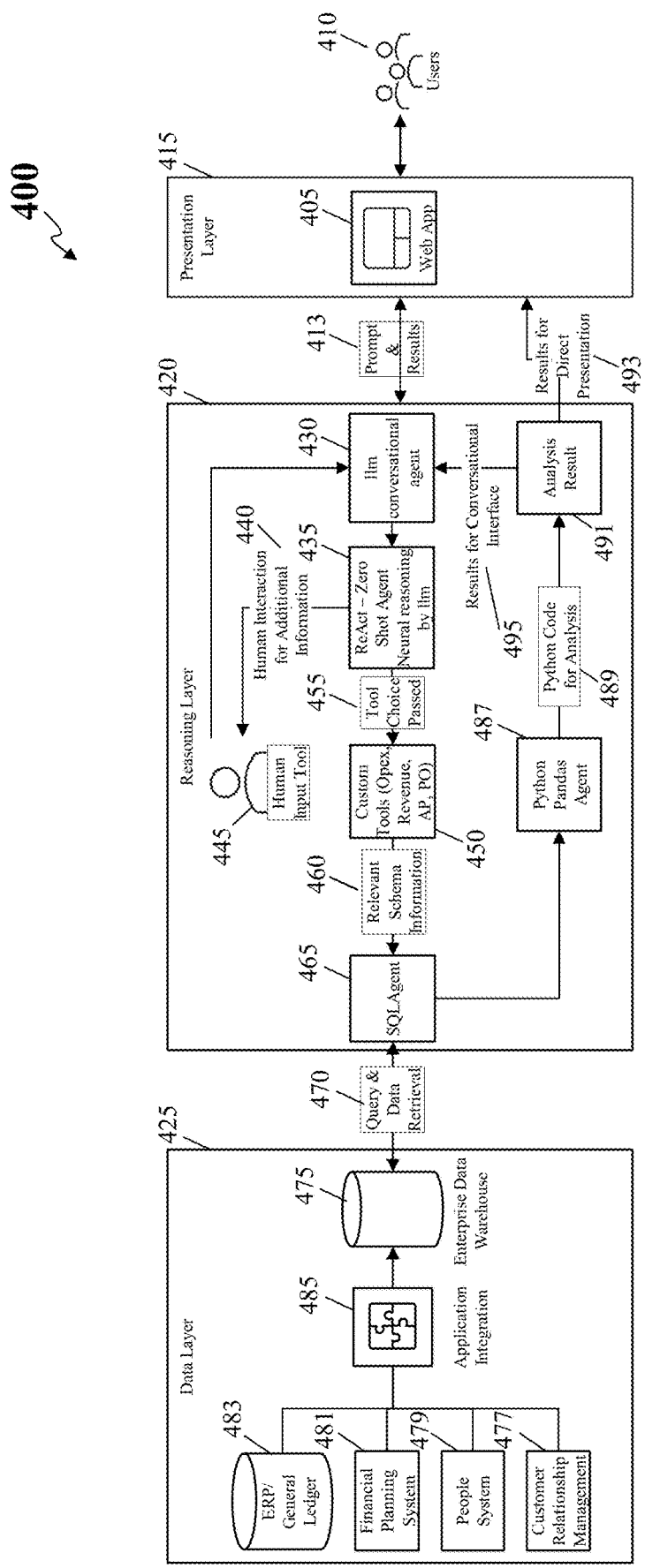
FIG. 4 illustrates a sequence diagram depicting operational steps for iterative large language model agent and tool selection for processing information requests, according to an embodiment.

FIG. 4 illustrates a sequence diagram depicting operational steps for iterative large language model agent and tool selection for processing information requests, according to an embodiment. The operational steps may be performed by an analytics server (e.g., the analytics server 110a). However, one or more of the operational steps may be executed by any number of computing devices operating in the distributed computing system described in FIG. 1. For instance, one or more computing devices (e.g., user devices) may locally perform part or all of the operational steps described with reference to FIG. 4. Moreover, one or more of the operational steps can be performed via any processor of the system, such as any processor of the system 100.

In the sequence diagram 400, an analytics server can execute a web application 405 to present a user interface to a user 410 at a computing device. The web application 405 can be an application of a presentation layer 415 configured to host a web platform through which users can input requests for information. The analytics server can receive such requests and generate responses to the requests for information through a reasoning layer 420 and a data layer 425. The web application 405 can display the responses to the user 410.

For example, the user 410 can input a request for information 413 into a user interface provided by the web application 405. The web application 405 can pass the request to a machine learning model 430 (e.g., a large language model). The machine learning model 430 can process the request for information (e.g., an information request) to determine an intent of the request for information. The analytics server can pass the intent to a task agent 435. The task agent 435 can be a machine learning language processing model and be configured to operate as a zero-shot agent (e.g., configured to generate responses to requests or inputs without any memory of previous inputs or outputs and/or execute other applications to generate results). The task agent 435 can process the intent and determine more information is needed to respond to the request for information. The task agent 435 can output a request for additional information 440 to the same user interface or a second user interface 445 displayed by a client device being accessed by the same user or a different user. The machine learning model 430 can receive the additional information and generate a second intent based on the additional information and the request for information. The analytics server can pass the second intent to the task agent 435. The task agent 435 can generate a list (e.g., a set) of applications 450 (e.g., custom tools, such as tool to manage operating expenses (Opex), Revenue, accounts payable (AP), purchase orders (PO), etc.) to use and one or more tasks to perform to respond to the request for information based on the second intent.

The task agent 435 can identify an application of the list of applications 450 to use to perform or satisfy a task (e.g., a first task) of the one or more tasks. The task agent 435 can pass the intent (e.g., the second intent) 455 to the tool and/or execute the application to generate schema information. The schema information can indicate a format of a source for a data query to retrieve data to complete or satisfy the task. The task agent or the application can pass the schema information, the intent, the task, and/or the content of the information request 460 to a querying agent 465 (e.g., a machine learning language processing model configured to generate data queries and perform the data queries). The querying agent 465 can generate a data query based on the received data. The querying agent 465 can query 470 a database 475 of the data layer for data using the data query.

The database 475 can include data regarding different systems of an entity or enterprise. For example, the database 475 can include data from a customer relationship management (CRM) system 477, a people system 479, a financial planning system 481, and/or a general ledger 483. The components 475-483 may be stored and/or executed by different computers or different computing systems. Data can be integrated 485 from the different systems 477-483 into the database 475. The data can be integrated in separate tables or be otherwise logically separate from each other based on the system in which the data originated (e.g., CRM data may be stored in a separate table from financial planning data). The querying agent 465 can retrieve a set of data of one or more of the systems 477-483 from the database 475 using the data query, such as by retrieving the set of data from a table corresponding to the one or more systems 477-483. An application 487 (e.g., a Python Pandas Agent) can receive the set of data from the task agent or the querying agent 465 and execute a function on the data to generate a result. The task agent 435 can analyze the result generated based on the set of data 489 to determine whether another iteration of generating a result is needed 491. This process can be completed using different applications until the application 487 generates results that, when aggregated together, satisfy the one or more tasks. Responsive to determining an aggregated result satisfies the one or more tasks, the aggregated result can be presented through the web application 405 directly 493 or passed to the machine learning model 430 for processing and to generate an output to present through the web application 405.

In an example, a finance manager of an organization can initiate a prompt asking "how have the expenses grown over the last two years, provide an explanation by Cost Center and GL account breakdown in a pivot table?" on a chat component of a user interface provided by an analytics server. Based on this prompt, the analytics server can execute a machine learning language processing model to determine an intent that the analysts want to analyze Opex data. The analytics server can execute a task agent to identify an Opex application based on the intent and the task agent can pass the question parsed as "Two year Opex view by CC and GL" to the Opex application. The Opex application can generate relevant schema information for the data source or data structure in which Opex data is stored and pass the schema information, the intent, and/or any other information related to the request to a SQL agent of the analytics server. The SQL agent can write a SQL query based on the information from the Opex application and query a data source using the SQL query to retrieve a set of data. The task agent or the SQL agent can pass the queried set of data to a Pandas Agent application. The Pandas Agent application can create a summary pivot table with the queried set of data. The analytics server can present the summary pivot table on a user interface.

Figure 5:
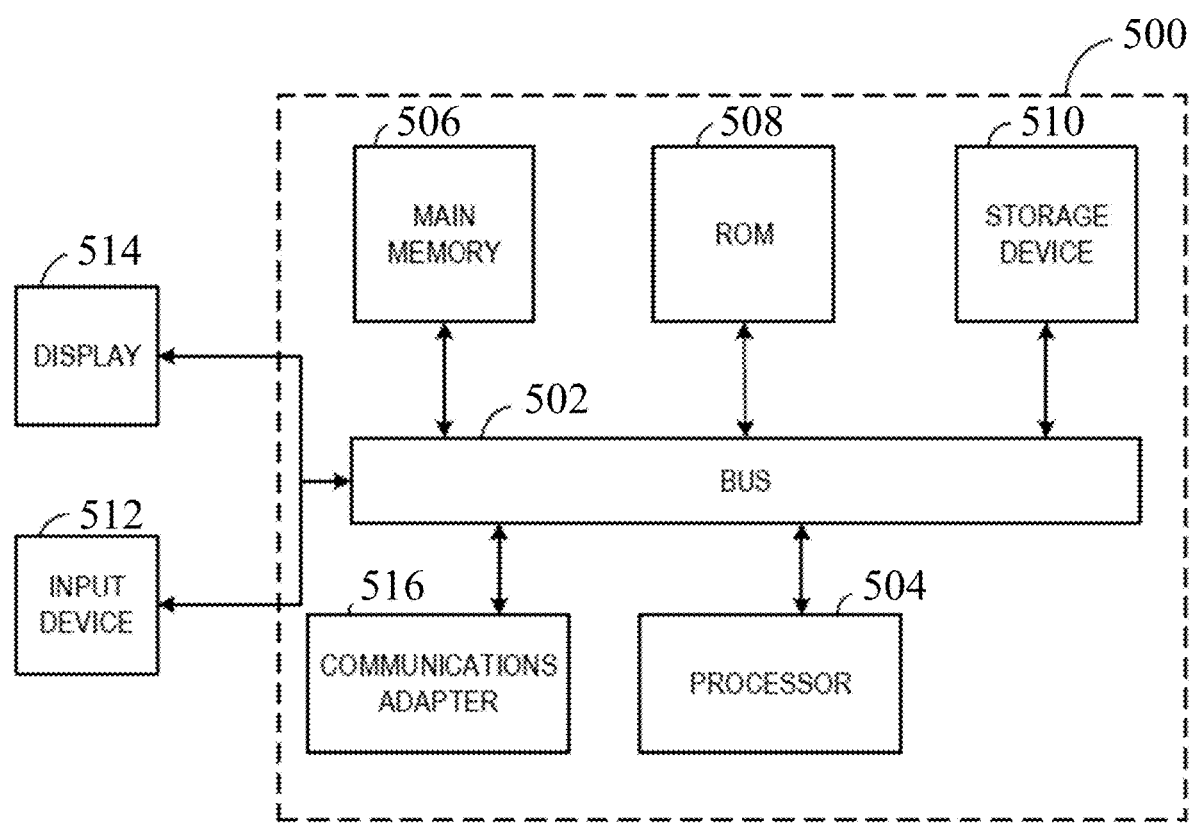
FIG. 5 illustrates a component diagram of a computing system suitable for use in the various implementations described herein, according to an embodiment.

FIG. 5 is a component diagram of an example computing system suitable for use in the various implementations described herein, according to an example implementation. One or more steps of the methods and processes discussed herein can be performed by the computing system depicted in FIG. 5.

The computing system 500 includes a bus 502 or other communication component for communicating information and a processor 504 coupled to the bus 502 for processing information. The computing system 500 also includes main memory 506, such as a RAM or other dynamic storage device, coupled to the bus 502 for storing information, and instructions to be executed by the processor 504. Main memory 506 can also be used for storing position information, temporary variables, or other intermediate information during execution of instructions by the processor 504. The computing system 500 may further include a ROM 508 or other static storage device coupled to the bus 502 for storing static information and instructions for the processor 504. A storage device 55, such as a solid-state device, magnetic disk, or optical disk, is coupled to the bus 502 for persistently storing information and instructions.

The computing system 500 may be coupled via the bus 502 to a display 514, such as a liquid crystal display, or active matrix display, for displaying information to a user. An input device 512, such as a keyboard including alphanumeric and other keys, may be coupled to the bus 502 for communicating information and command selections to the processor 504. In another implementation, the input device 512 has a touch screen display. The input device 512 can include any type of biometric sensor, or a cursor control, such as a mouse, a trackball, or cursor direction keys, for communicating direction information and command selections to the processor 504 and for controlling cursor movement on the display 514.

In some implementations, the computing system 500 may include a communications adapter 516, such as a networking adapter. Communications adapter 516 may be coupled to bus 502 and may be configured to enable communications with a computing or communications network or other computing systems. In various illustrative implementations, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 500 in response to the processor 504 executing an implementation of instructions contained in main memory 506. Such instructions can be read into main memory 506 from another computer-readable medium, such as the storage device 510. Execution of the implementation of instructions contained in main memory 506 causes the computing system 500 to perform the illustrative processes described herein. One or more processors in a multi-processing implementation may also be employed to execute the instructions contained in the main memory 506. In alternative implementations, hard-wired circuitry may be used in place of or in combination with software instructions to implement illustrative implementations. Thus, implementations are not limited to any specific combination of hardware circuitry and software.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A method comprising steps of:
receiving, by a server via a user interface, a request for information for processing via at least one machine learning model;
executing, by the server, the at least one machine learning model using a context of the request to determine an intent of the request;
identifying, by the server using a task agent, a set of applications and one or more tasks to return a result for the request for information based at least on the intent;
executing, by the server using the task agent, a first application of the set of applications to generate a first result containing a first set of data based on the one or more tasks;
responsive to determining, by the server by inputting the first result containing the first set of data and identifications of the one or more tasks into the task agent, the first result containing the first set of data does not satisfy the one or more tasks, executing, by the server using the task agent, a second application to generate a second result containing a second set of data based on the one or more tasks, wherein the task agent iteratively determines whether to execute another application based on whether all generated results satisfy the one or more tasks using the generated results as input into the task agent;
wherein the one or more tasks comprise a plurality of tasks, and wherein iteratively determining whether to execute another application comprises, for each iterative determination:
generating, by the server, a feature vector comprising identifications of the plurality of tasks and each of the generated results including at least the first result and the second result; and
executing, by the server, the task agent using the feature vector as input to output an indication of whether the generated results satisfy all of the plurality of tasks;
responsive to the task agent outputting an indication that a combination of all of the generated results satisfy the one or more tasks, generating, by the server, an aggregated result based on at least the first result and the second result; and
presenting, by the server, the aggregated result on the user interface responsive to the request.

2. The method of claim 1, wherein identifying the set of applications using the task agent comprises:
executing, by the server, a second machine learning model using the intent to output an identification of each application of the set of applications; and
identifying, by the server, the set of applications based on the output identifications of the set of applications.

3. The method of claim 1, wherein identifying the set of applications using the task agent comprises:
executing, by the server, a second machine learning model using the intent to output an indication that more information is needed to identify the set of applications;
presenting, by the server, the indication that more information is needed to identify the set of applications;
receiving, by the server, additional information;
executing, by the server, the at least one machine learning model using the context of the request and the additional information to determine a second intent;

executing, by the server, the second machine learning model using at least the second intent to output an identification of each application of the set of applications; and identifying, by the server, the set of applications based on the output identification of each application of the set of applications.

4. The method of claim 1, comprising steps of:

generating, by the server using the first application, first schema information corresponding to the first application;

executing, by the server, a second machine learning model using the first schema information and a first task of the one or more tasks to generate a first data query; and retrieving, by the server, the first set of data from a first data source using the generated first data query.

5. The method of claim 4, wherein executing the second machine learning model comprises:

executing, by the server, the second machine learning model using the first schema information and the first task to generate a query, wherein retrieving the first set of data from the first data source using the first data query comprises retrieving, by the server, the first set of data from the first data source using the query.

6. The method of claim 4, comprising steps of:

generating, by the server using the second application, second schema information corresponding to the second application;

executing, by the server, the second machine learning model using the second schema information and a second task of the one or more tasks to generate a second data query; and retrieving, by the server, the second set of data from a second data source using the generated second data query.

7. The method of claim 4, wherein retrieving the first set of data from the first data source using the first data query comprises retrieving, by the server, the first set of data from the first data source remote from a computing device housing the server.

8. The method of claim 4, wherein retrieving the first set of data from the first data source using the first data query comprises retrieving, by the server, the first set of data from memory of a computing device housing the server.

9. The method of claim 1, wherein executing the at least one machine learning model using the context of the request to determine the intent of the request comprises executing, by the server, a first machine learning model using the context to determine the intent of the request, wherein identifying the set of applications using the task agent comprises executing, by the server, a second machine learning model using the intent to output an identification for each application of the set of applications, and wherein the method comprises steps of:

generating, by the server using the first application, first schema information corresponding to the first application;

executing, by the server, a third machine learning model using at least the first schema information to generate a data query; and retrieving, by the server, the first set of data from a data source using the generated data query.

10. The method of claim 1, wherein receiving the request for information comprises receiving, by the one or more processor and in the request for information, a format for the result; and wherein generating the aggregated result comprises generating, by the server, the aggregated result in the received format.

11. The method of claim 1, wherein presenting the aggregated result on the user interface comprises:

executing, by the server, the at least one machine learning model using the aggregated result to generate an output including the aggregated result; and presenting, by the server, the output including the aggregated result on the user interface.

12. A system comprising:

a server comprising memory and configured by computer readable media to perform steps of:

receiving, via a user interface, a request for information for processing via at least one machine learning model;

executing the at least one machine learning model using a context of the request to determine an intent of the request;

identifying, using a task agent, a set of applications and one or more tasks to return a result for the request for information based at least on the intent;

executing, using the task agent, a first application of the set of applications to generate a first result containing a first set of data based on the one or more tasks;

responsive to determining, by inputting the first result containing the first set of data and identifications of the one or more tasks into the task agent, the first result containing the first set of data does not satisfy the one or more tasks, executing, using the task agent, a second application to generate a second result containing a second set of data based on the one or more tasks, wherein the task agent iteratively determines whether to execute another application based on whether all generated results satisfy the one or more tasks using all of the generated results as input into the task agent;

wherein the one or more tasks comprise a plurality of tasks, and wherein iteratively determining whether to execute another application comprises, for each iterative determination:

generating, by the server, a feature vector comprising identifications of the plurality of tasks and each of the generated results including at least the first result and the second result; and executing, by the server, the task agent using the feature vector as input to output an indication of whether the generated results satisfy all of the plurality of tasks;

responsive to the task agent outputting an indication that a combination of all of the generated results satisfy the one or more tasks, generating an aggregated result based on at least the first result and the second result; and presenting the aggregated result on the user interface responsive to the request.

13. The system of claim 12, wherein the server is configured to identify the set of applications using the task agent by:

executing a second machine learning model using the intent to output an identification of each application of the set of applications; and identifying the set of applications based on the output identifications of the set of applications.

14. The system of claim 12, wherein the server is configured to identify the set of applications using the task agent by:
- executing a second machine learning model using the intent to output an indication that more information is needed to identify the set of applications;
- presenting the indication that more information is needed to identify the set of applications at the user interface or at a second user interface presented on a client device;
- receiving additional information from the user interface or the second user interface;
- executing the at least one machine learning model using the context of the request and the additional information to determine a second intent;
- executing the second machine learning model using at least the second intent to output an identification of each application of the set of applications; and
- identifying the set of applications based on the output identification of each application of the set of applications.

15. The system of claim 12, wherein the server is configured to perform steps of:
- generating, using the first application, first schema information corresponding to the first application;
- executing a second machine learning model using the first schema information and a first task of the one or more tasks to generate a first data query; and
- retrieving the first set of data from a first data source using the generated first data query.

16. The system of claim 15, wherein the server is configured to execute the second machine learning model by:
- executing the second machine learning model using the first schema information and the first task to generate a structured query language (SQL) query, and
- wherein the server is configured to retrieve the first set of data from the first data source using the first data query by retrieving the first set of data from the first data source using the SQL query.

17. The system of claim 15, wherein the server is configured to perform steps of:
- generating, using the second application, second schema information corresponding to the second application;
- executing the second machine learning model using the second schema information and a second task of the one or more tasks to generate a second data query; and
- retrieving the second set of data from a second data source using the generated second data query.

18. The system of claim 15, wherein the server is configured to retrieve the first set of data from the first data source using the first data query by retrieving the first set of data from the first data source remote from a computing device housing the one or more processors.

19. The system of claim 12, wherein the server is configured to execute the at least one machine learning model using the context of the request to determine the intent of the request by executing a first machine learning model using the context to determine the intent of the request,
- wherein the server is configured to identify the set of applications using the task agent by executing a second machine learning model using the intent to output an identification for each application of the set of applications, and
- wherein the server is configured to perform steps of:
  - generating, using the first application, first schema information corresponding to the first application;
  - executing a third machine learning model using at least the first schema information to generate a data query; and
  - retrieving the first set of data from a data source using the generated data query.

* * * * *